(12) United States Patent
Moon et al.

(10) Patent No.: US 8,855,072 B2
(45) Date of Patent: Oct. 7, 2014

(54) RELAY BACKHAUL RESOURCE ALLOCATION

(75) Inventors: Sung Ho Moon, Anyang-si (KR); So Yeon Kim, Anyang-si (KR); Kyu Jin Park, Anyang-si (KR); Jae Hoon Chung, Anyang-si (KR); Min Seok Noh, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 13/388,969

(22) PCT Filed: Aug. 2, 2010

(86) PCT No.: PCT/KR2010/005070
§ 371 (c)(1),
(2), (4) Date: Feb. 6, 2012

(87) PCT Pub. No.: WO2011/016653
PCT Pub. Date: Feb. 10, 2011

(65) Prior Publication Data
US 2012/0140726 A1    Jun. 7, 2012

Related U.S. Application Data

(60) Provisional application No. 61/232,774, filed on Aug. 10, 2009, provisional application No. 61/231,028, filed on Aug. 4, 2009.

(30) Foreign Application Priority Data

Jul. 29, 2010  (KR) .................. 10-2010-0073365

(51) Int. Cl.
*H04W 4/00* (2009.01)
*H04B 7/14* (2006.01)
*H04W 28/26* (2009.01)
*H04B 7/155* (2006.01)
*H04B 7/26* (2006.01)
*H04L 5/00* (2006.01)
*H04W 92/12* (2009.01)
*H04W 48/08* (2009.01)
*H04W 88/04* (2009.01)
*H04W 72/04* (2009.01)

(52) U.S. Cl.
CPC ............ *H04B 7/2606* (2013.01); *H04W 28/26* (2013.01); *H04L 5/0044* (2013.01); *H04B 7/155* (2013.01); *H04W 92/12* (2013.01); *H04W 48/08* (2013.01); *H04W 88/04* (2013.01); *H04L 5/0094* (2013.01); *H04W 72/042* (2013.01); *H04L 5/0053* (2013.01)
USPC ............................ 370/329; 370/279; 370/315

(58) Field of Classification Search
CPC .................................................... H04W 28/04
USPC ........................................ 370/329, 279, 315
See application file for complete search history.

(56) References Cited

U.S. PATENT DOCUMENTS

| | | |
|---|---|---|
| 2007/0242636 A1 | 10/2007 | Kashima et al. |
| 2007/0281613 A1 | 12/2007 | Lee et al. |
| 2008/0025254 A1* | 1/2008 | Love et al. .................... 370/329 |
| 2008/0090575 A1 | 4/2008 | Barak et al. |
| 2008/0095195 A1 | 4/2008 | Ahmadi et al. |
| 2008/0165881 A1 | 7/2008 | Tao et al. |
| 2008/0205348 A1 | 8/2008 | Malladi |
| 2008/0227386 A1 | 9/2008 | Dayal et al. |
| 2009/0268687 A1 | 10/2009 | Lee et al. |
| 2009/0303918 A1 | 12/2009 | Ma et al. |
| 2010/0040001 A1* | 2/2010 | Montojo et al. .............. 370/329 |
| 2010/0110942 A1* | 5/2010 | Cai et al. ........................ 370/279 |
| 2010/0254301 A1* | 10/2010 | Blankenship et al. ......... 370/315 |
| 2011/0103338 A1 | 5/2011 | Astely et al. |

FOREIGN PATENT DOCUMENTS

| | | |
|---|---|---|
| KR | 1020070074110 | 7/2007 |
| KR | 1020090008178 | 1/2009 |
| WO | 2008/115826 | 9/2008 |

OTHER PUBLICATIONS

3rd Generation Partnership Project (3GPP); "Technical Specification Group Radio Access Network; Evolved Universal Terrestrial Radio Access (E-UTRA); Physical Channels and Modulation (Release 8)", 3GPP TS 36.211 V8.4.0, Sep. 2008.

\* cited by examiner

*Primary Examiner* — Kiet Tang
(74) *Attorney, Agent, or Firm* — Lee, Hong, Degerman, Kang & Waimey

(57) ABSTRACT

The present invention relates to a method for allocating a relay backhaul resource in a wireless communication system and to an apparatus for same. In detail, the present invention provides a signal-receiving method in which a terminal receives a signal in a wireless communication system, and to an apparatus for same, wherein the method comprises a step of receiving, from a base station, information on one or more first resource blocks (RB) allocated for a relay, a step of receiving resource allocation information through a control channel from the base station, and a step of receiving a predetermined resource block indicated by the resource allocation information among logically continuous second resource blocks. The second resource blocks are logically continuous when excluding said one or more first resource blocks from the entirety of the resource block.

2 Claims, 17 Drawing Sheets

RELAY BACKHAUL RESOURCE ALLOCATION

CROSS-REFERENCE TO RELATED APPLICATIONS

This application is the National Stage filing under 35 U.S.C. 371 of International Application No. PCT/KR2010/005070, filed on Aug. 2, 2010, which claims the benefit of earlier filing date and right of priority to Korean Application No. 10-2010-0073365, filed on Jul. 29, 2010, and also claims the benefit of U.S. Provisional Application Ser. Nos. 61/232,774, filed on Aug. 10, 2009, and 61/231,028, filed on Aug. 4, 2009, the contents of which are all incorporated by reference herein in their entirety.

TECHNICAL FIELD

The present invention relates to a wireless communication system, and more particularly, to a method for allocating a relay backhaul resource and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE

Technical Problem

An object of the present invention devised to solve the conventional problem is to provide to a method for effectively allocating a relay backhaul resource in a relay system and an apparatus for the same.

It will be appreciated by persons skilled in the art that the objects that could be achieved with the present invention are not limited to what have been particularly described hereinabove and the above and other objects that the present invention could achieve will be more clearly understood from the following detailed description.

Technical Solution

In one aspect of the present invention, a method for receiving a signal in a user equipment of a wireless communication system comprises the steps of receiving, from a base station, information on one or more first resource blocks (RB) allocated for a relay; receiving resource allocation information from the base station through a control channel; and receiving a predetermined resource block indicated by the resource allocation information among logically contiguous second resource blocks, wherein the second resource blocks are logically contiguous when excluding said one or more first resource blocks from the entirety of the resource blocks.

In another aspect of the present invention, a user equipment comprises a radio frequency (RF) unit configured to transmit and receive a radio signal to and from a base station; and a processor receiving, from a base station, information on one or more first resource blocks (RB) allocated for a relay, receiving resource allocation information from the base station through a control channel, and receiving a predetermined resource block indicated by the resource allocation information among logically contiguous second resource blocks, wherein the second resource blocks are logically contiguous when excluding said one or more first resource blocks from the entirety of the resource blocks.

In this case, the resource blocks may include virtual resource blocks (VRBs). Also, the control channel may include a physical downlink control channel (PDCCH). Also, the logically contiguous second resource blocks may exist on a backhaul subframe. Also, the logically contiguous second resource blocks may correspond to a physical downlink shared channel (PDSCH).

Advantageous Effects

According to the embodiment of the present invention, transmission timing uplink ACK/NACK signals can effectively be controlled in a wireless communication system, preferably a relay system.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
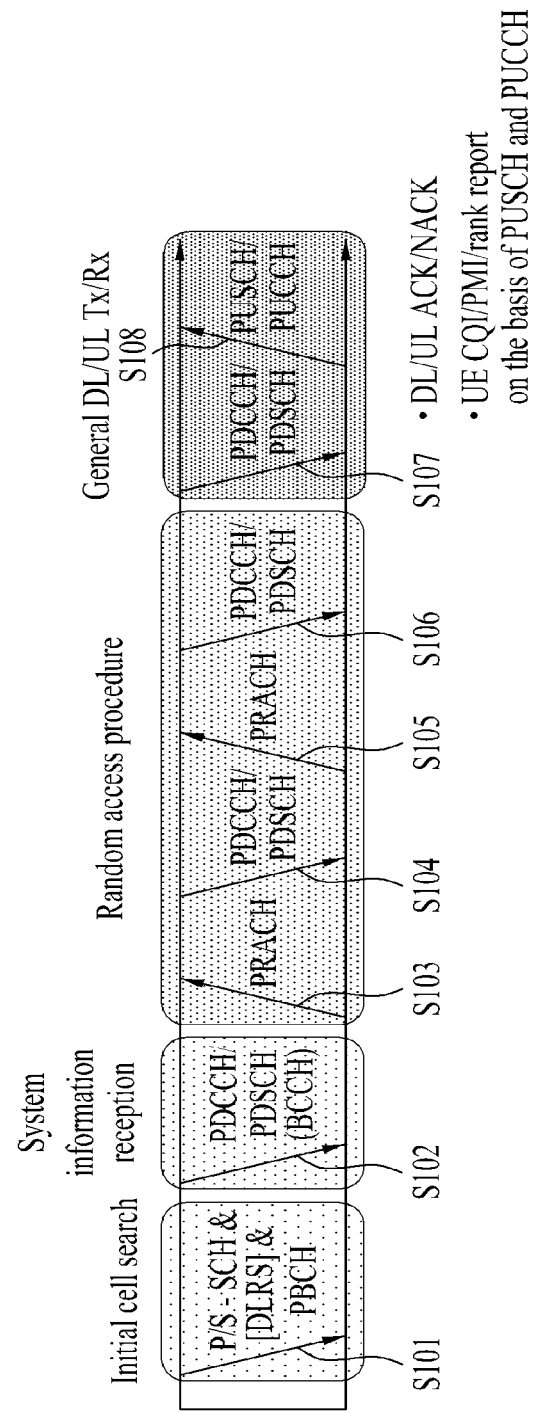
FIG. 1 is a diagram illustrating physical channels used in a 3rd generation partnership project (3GPP) system and signal transmission using the physical channels.

FIG. 1 is a diagram illustrating physical channels used in an LTE system and signal transmission using the physical channels.

The user equipment performs initial cell search such as synchronizing with the base station when it newly enters a cell or the power is turned on (S101). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station.

The user equipment which has finished the initial cell search may acquire more detailed system information by receiving a physical downlink shared channel (PDSCH) in accordance with a physical downlink control channel (PDCCH) and information carried in the PDCCH (S102).

Meanwhile, if the user equipment initially accesses the base station, or if there is no radio resource for signal transmission, the user equipment may perform a random access procedure (RACH) for the base station (S103 to S106). To this end, the user equipment may transmit a preamble of a specific sequence through a physical random access channel (PRACH) (S103 and S105), and may receive a response message to the preamble through the PDCCH and the PDSCH corresponding to the PDCCH (S104 and S106). In case of a contention based RACH, a contention resolution procedure may be performed additionally.

The user equipment which has performed the aforementioned steps may receive the PDCCH/PDSCH (S107) and transmit a physical uplink shared channel (PUSCH) and a physical uplink control channel (PUCCH) (S108), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 2:
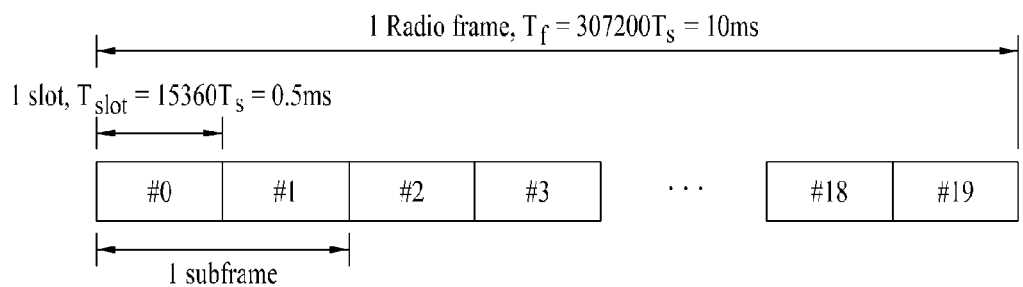
FIG. 2 is a diagram illustrating a structure of a radio frame used in the 3GPP system.

FIG. 2 is a diagram illustrating a structure of a radio frame used in the 3GPP system.

Referring to FIG. 2, the radio frame has a length of 10 ms ($327200 \cdot T_s$) and includes ten (10) subframes of an equal size. Each sub frame has a length of 1 ms and includes two slots. Each slot has a length of 0.5 ms ($15360 \cdot T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers× seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 3:
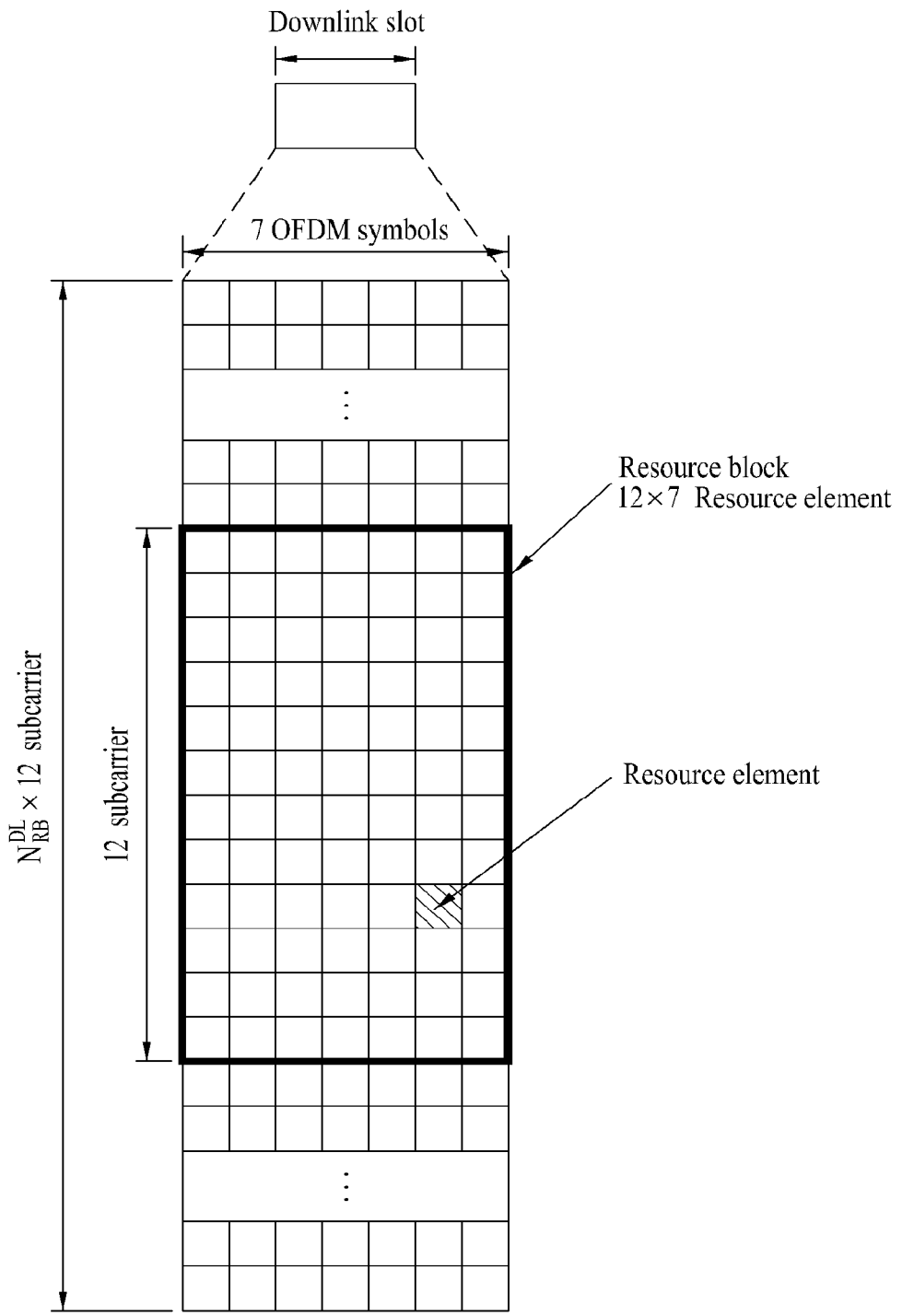
FIG. 3 is a diagram illustrating a resource grid of a downlink slot.

FIG. 3 is a diagram illustrating a resource grid of a downlink slot.

Referring to FIG. 3, the downlink slot includes a number of OFDM symbols in a time region and $N^{DL}_{RB}$ number of resource blocks in a frequency region. Since each resource block includes twelve subcarriers, the downlink slot includes $N^{DL}_{RB} \times 12$ number of subcarriers in the frequency region. Although an example of FIG. 3 illustrates that the downlink slot includes seven OFDM symbols and the resource block includes twelve subcarriers, the present invention is not limited to the example of FIG. 3. For example, the number of OFDM symbols included in the downlink slot may be varied depending on a length of cyclic prefix (CP). Each element on the resource grid will be referred to as a resource element (RE). The resource element (RE) is a minimum time/frequency resource defined in a physical channel, and is indicated by one OFDM symbol index and one subcarrier index. One resource block (RB) includes $N_{symb}^{DL} \times N_{sc}^{RB}$ number of resource elements. $N_{symb}^{DL}$ is the number of OFDM symbols included in the downlink slot, and $N_{sc}^{RB}$ is the number of subcarriers included in the resource block. The number $N^{DL}_{RB}$ of resource blocks included in the downlink slot is subjected to a downlink transmission bandwidth established in a cell.

Figure 4:
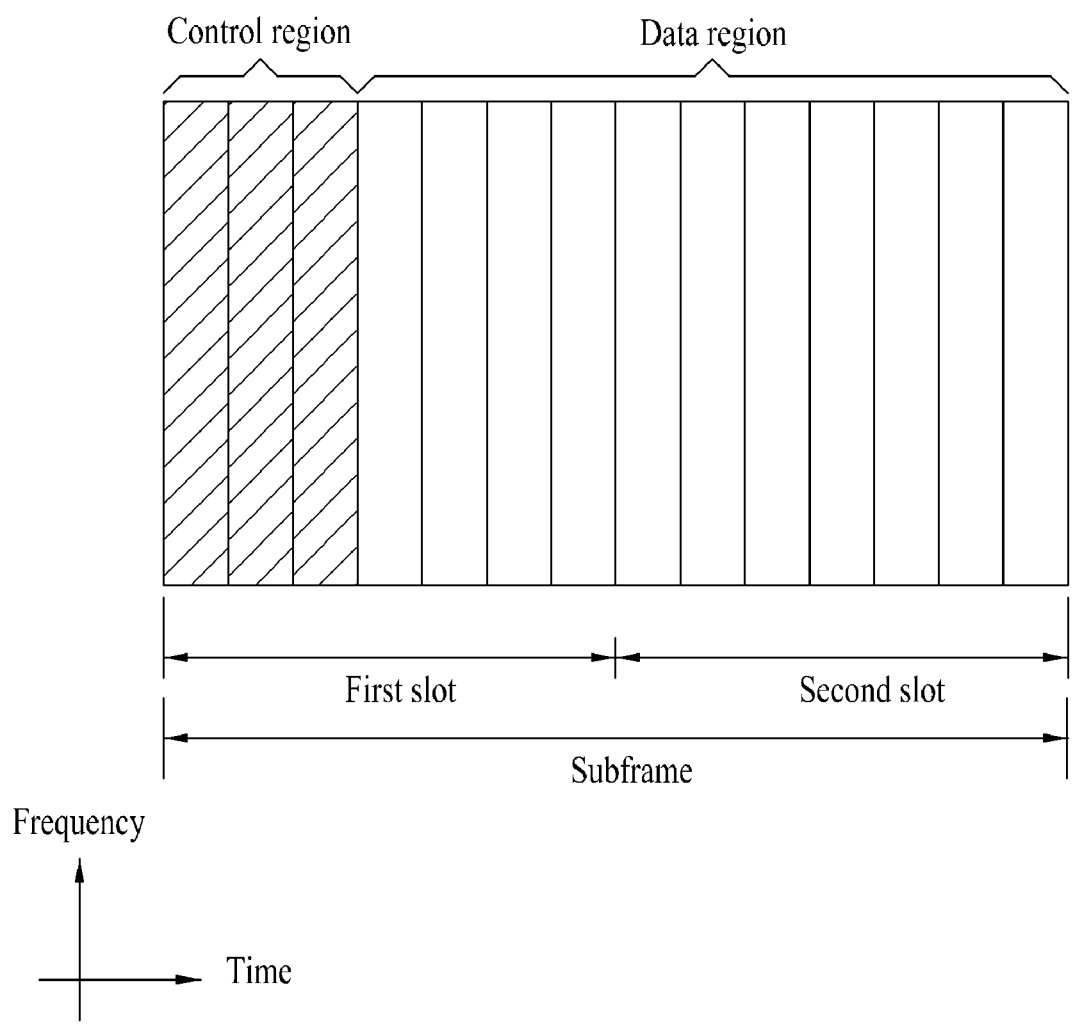
FIG. 4 is a diagram illustrating a structure of a downlink subframe.

FIG. 4 is a diagram illustrating a structure of a downlink subframe used in the 3GPP system.

Referring to FIG. 4, the downlink subframe includes a plurality of OFDM symbols (for example, twelve or fourteen OFDM symbols). A plurality of OFDM symbols located at the front of the subframe are used as a control region, and the other OFDM symbols are used as a data region. The control region is used to transmit scheduling information and the other L1/L2 (layer 1/layer 2) control information. The data region is used to transmit traffic. Examples of a control channel include a PCFICH (Physical Control Format Indicator CHannel), a PHICH (Physical Hybrid ARQ Indicator CHannel), and a PDCCH (Physical Downlink Control CHannel). A traffic channel includes a PDSCH (Physical Downlink Shared Channel).

The PDCCH notifies each user equipment or user equipment group of information on resource allocation of transport channels, i.e., a paging channel (PCH) and a downlink shared channel (DL-SCH), uplink scheduling grant, and HARQ information. The paging channel and the DL-SCH are transmitted through the PDSCH. Accordingly, the base station and the user equipment transmit and receive data to and from each other through the PDSCH except for specific control information or specific service data. The control information transmitted through the PDCCH will be referred to as downlink control information (DCI). The DCI includes uplink resource allocation information, downlink resource allocation information and an uplink transmission power control command for random user equipment groups. Table 1 illustrates the DCI based on a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI form at 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

The DCI format 0 represents uplink resource allocation information, the DCI formats 1 and 2 represent downlink resource allocation information, and the DCI formats 3 and 3A represent uplink transmit power control (TPC) command for random user equipment groups. The base station determines a PDCCH format in accordance with the DCI to be transmitted to the user equipment, and prefixes a cyclic redundancy check (CRC) to the control information. The CRC is masked with unique identifier (for example, radio network temporary identifier (RNTI)) depending on an owner or usage of the PDCCH.

Figure 5:
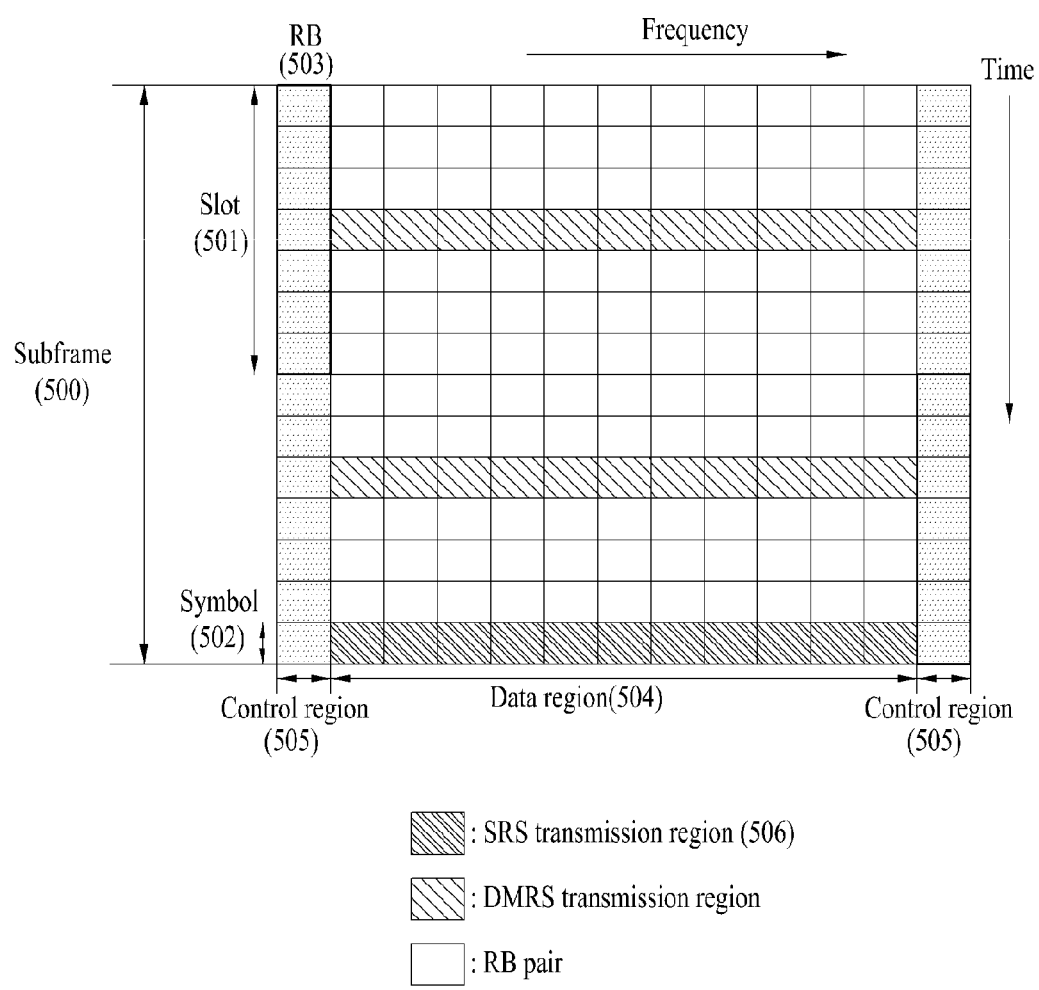
FIG. 5 is a diagram illustrating a structure of an uplink subframe used in the 3GPP system.

FIG. 5 is a diagram illustrating a structure of an uplink subframe used in the 3GPP system.

Referring to FIG. 5, a subframe 500 of 1 ms, which is a basic unit of LTE uplink transmission, includes two slots 501 of 0.5 ms. In case of a normal cyclic prefix (CP), each slot may include seven symbols 502, each of which corresponds to each SC-FDMA symbol. A resource block (RB) 503 is a resource allocation unit corresponding to twelve subcarriers in a frequency domain and one slot in a time domain. The uplink subframe of the LTE is divided into a data region 504 and a control region 505. The data region means a communication resource used for transmission of data such as voice and packet transmitted to each user equipment, and includes a PUSCH (Physical Uplink Shared Channel). The control region means a communication resource used to transmit downlink channel quality report from each user equipment, ACK/NACK related to reception of a downlink signal, and an uplink scheduling request, and includes a PUCCH (Physical Uplink Control Channel). A sounding reference signal (SRS) is transmitted through the last SC-FDMA symbol on a time axis in one subframe and a data transmission band on a frequency axis. The sounding reference signals of several user equipments, which are transmitted to the last SC-FDMA of the same subframe, may be identified depending on frequency location/sequence.

Hereinafter, resource block mapping will be described. Physical resource blocks (PRBs) and virtual resource blocks (VRBs) are defined. The physical resource blocks are as illustrated in FIG. 3. In other words, the physical resource blocks are defined by $N_{symb}^{DL}$ continuous OFDM symbols in the time domain and $N_{sc}^{RB}$ subcarriers in the frequency domain. The physical resource blocks are given by numbers $0 \sim N_{RB}^{DL}-1$ in the frequency domain. The relation between the physical resource block number $n_{PRB}$ and resource elements (k,l) of the slot is expressed by the following Equation 1.

$$n_{PRB} = \left\lfloor \frac{k}{N_{sc}^{RB}} \right\rfloor \qquad [\text{Equation 1}]$$

In this case, k is a subcarrier index, and $N_{sc}^{RB}$ the number of subcarriers included in one resource block.

The virtual resource blocks have the same size as that of the physical resource blocks. Localized type virtual resource blocks (LVRB) and distributed type virtual resource blocks (DVRB) are defined. A pair of resource blocks are allocated to two slots of the subframe by a single virtual resource block number $n_{VRB}$ regardless of the type of the virtual resource block.

Figure 6:
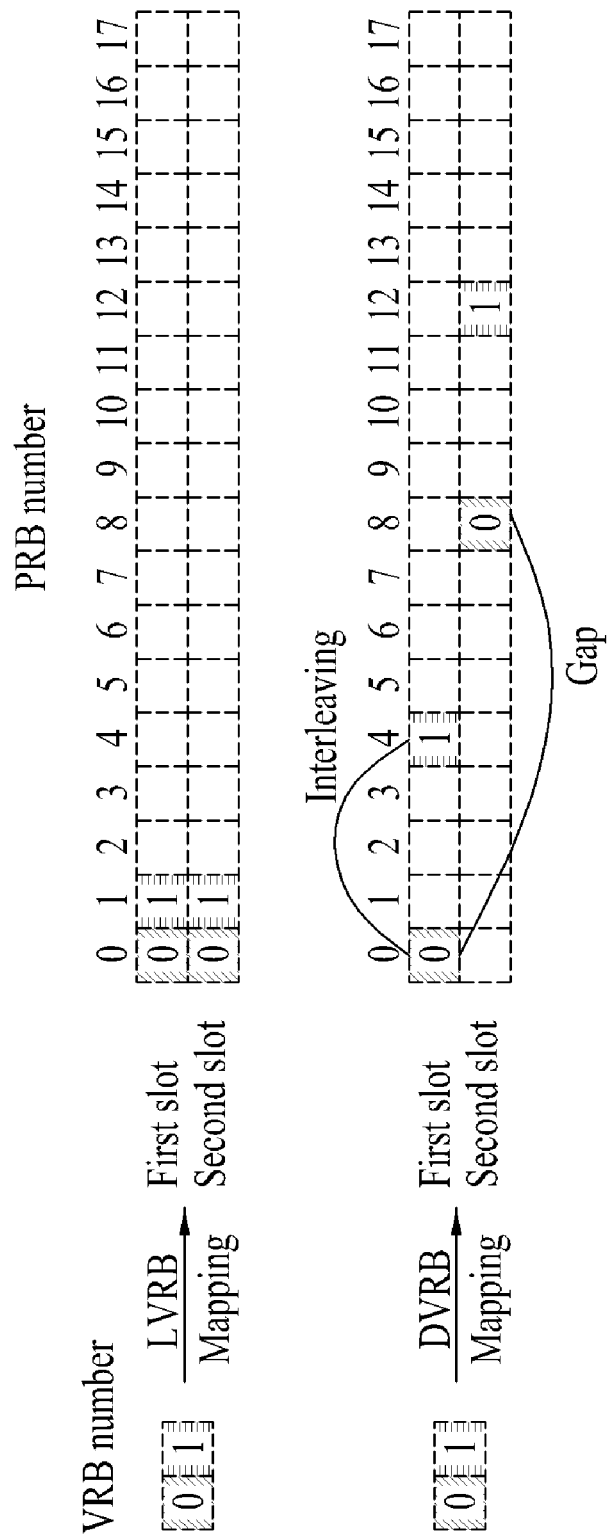
FIG. 6 is a diagram illustrating mapping of a virtual resource block (VRB) into a physical resource block (PRB)

FIG. 6 is a diagram illustrating mapping of a virtual resource block (VRB) into a physical resource block (PRB).

Referring to FIG. 6, since the LVRB is directly mapped into the PRB, a virtual resource block number $n_{VRB}$ corresponds to the physical resource block number $n_{PRB}$ ($n_{PRB}=n_{VRB}$). The VRBs are given by numbers $0 \sim N_{VRB}^{DL}-1$, and $N_{VRB}^{DL}=N_{RB}^{DL}$. On the other hand, the DVRB is mapped into the PRB through interleaving. In more detail, the DVRB may be mapped into the PRB as expressed by Table 2 below. Table 2 illustrates RB gap values.

TABLE 2

| System BW ($N_{RB}^{DL}$) | Gap ($N_{gap}$) | |
|---|---|---|
| | $1^{st}$ gap ($N_{gap,1}$) | $2^{nd}$ gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

In Table 2, $N_{gap}$ represents a frequency interval (for example, PRB unit) when the VRBs of the same number are mapped into the PRBs of the first slot and the second slot. In case of $6 \leq N_{RB}^{DL} \leq 49$, only one gap value is defined ($N_{gap}=N_{gap,1}$). In case of $50 \leq N_{RB}^{DL} \leq 110$, two gap values ($N_{gap,1}$ and $N_{gap,2}$) are defined. $N_{gap}=N_{gap,1}$ or $N_{gap}=N_{gap,2}$ is signaled through downlink scheduling. The DVRBs are given by numbers $0 \sim N_{VRB}^{DL}-1$, are $N_{VRB}^{DL}=N_{VRB,gap1}^{DL}=2 \cdot \min(N_{gap}, N_{RB}^{DL}-N_{gap})$ for $N_{gap}=N_{gap,1}$, and $N_{VRB}^{DL}=N_{VRB,gap2}^{DL}=\lfloor N_{RB}^{DL}/2N_{gap}\rfloor \cdot 2N_{gap}$ for $N_{gap}=N_{gap,2}$. Also, min(A,B) represents the smaller value of A and B.

The continuous $\tilde{N}_{VRB}^{DL}$ VRB numbers constitute a unit for VRB number interleaving. In case of $N_{gap}=N_{gap,1}$, $\tilde{N}^{DL}=N_{VRB}^{DL}$, and in case of $N_{gap}=N_{gap,2}$, $\tilde{N}_{VRB}^{DL}=2\tilde{N}_{gap}$. VRB number interleaving of each interleaving unit may be performed using four columns and $N_{row}$ rows. $N_{row}=\lceil \tilde{N}_{VRB}^{DL}/(4P) \rceil \cdot P$ is obtained, wherein P represents a size of a resource block group (RBG). The RBG is defined by P continuous resource blocks. The VRB numbers are written in a matrix in a row-by-row format, and read out in a column-by-column format. $N_{null}$ nulls are inserted into the last $N_{null}/2$ rows of the second and fourth columns, and $N_{null}=4N_{row}-\tilde{N}_{VRB}^{DL}$. The null values are disregarded during reading.

Figure 7:
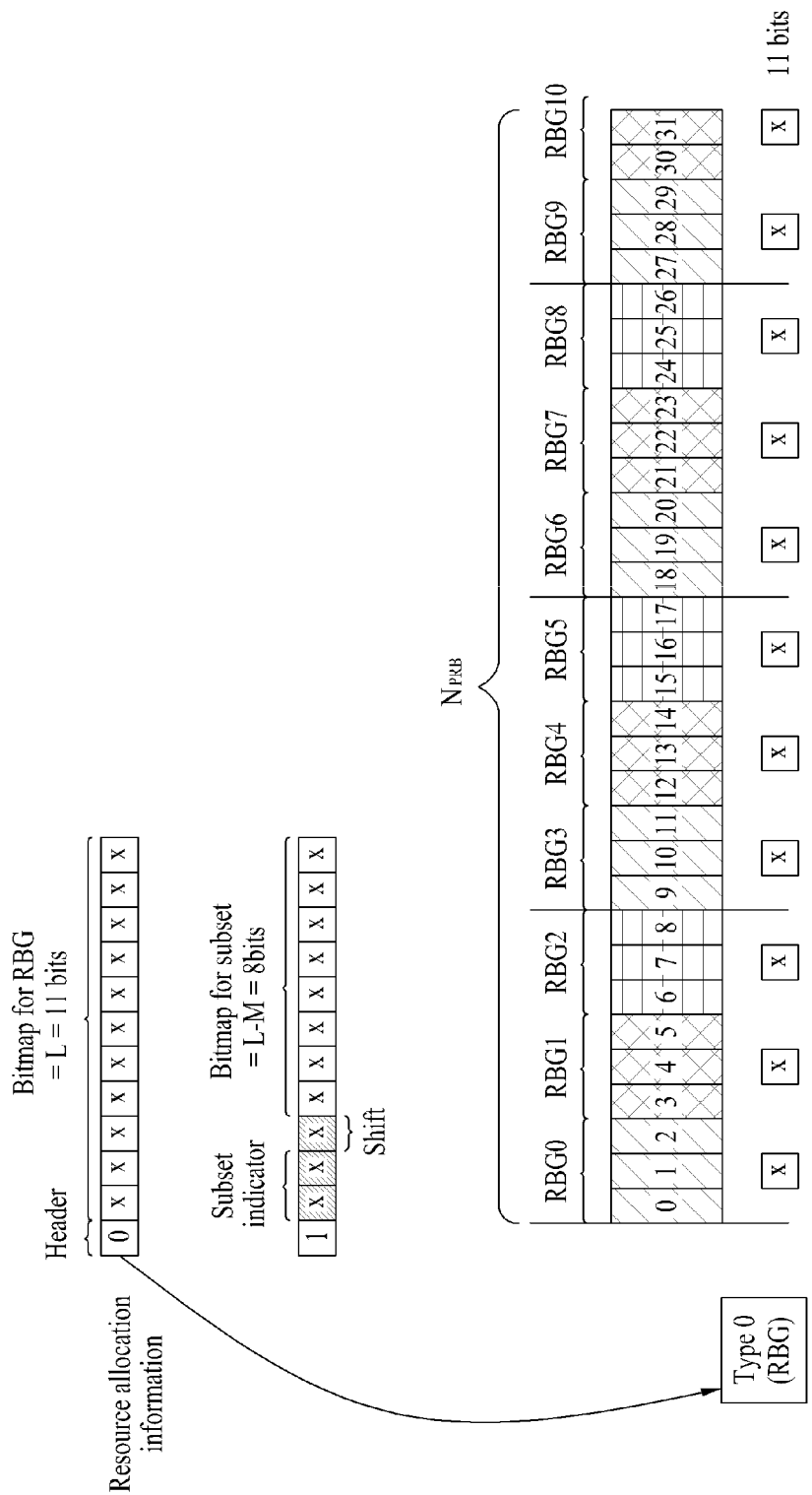
FIG. 7 to FIG. 9 are diagrams illustrating type 0 resource allocation, type 1 resource allocation and type 2 resource allocation, respectively.
Figure 8:
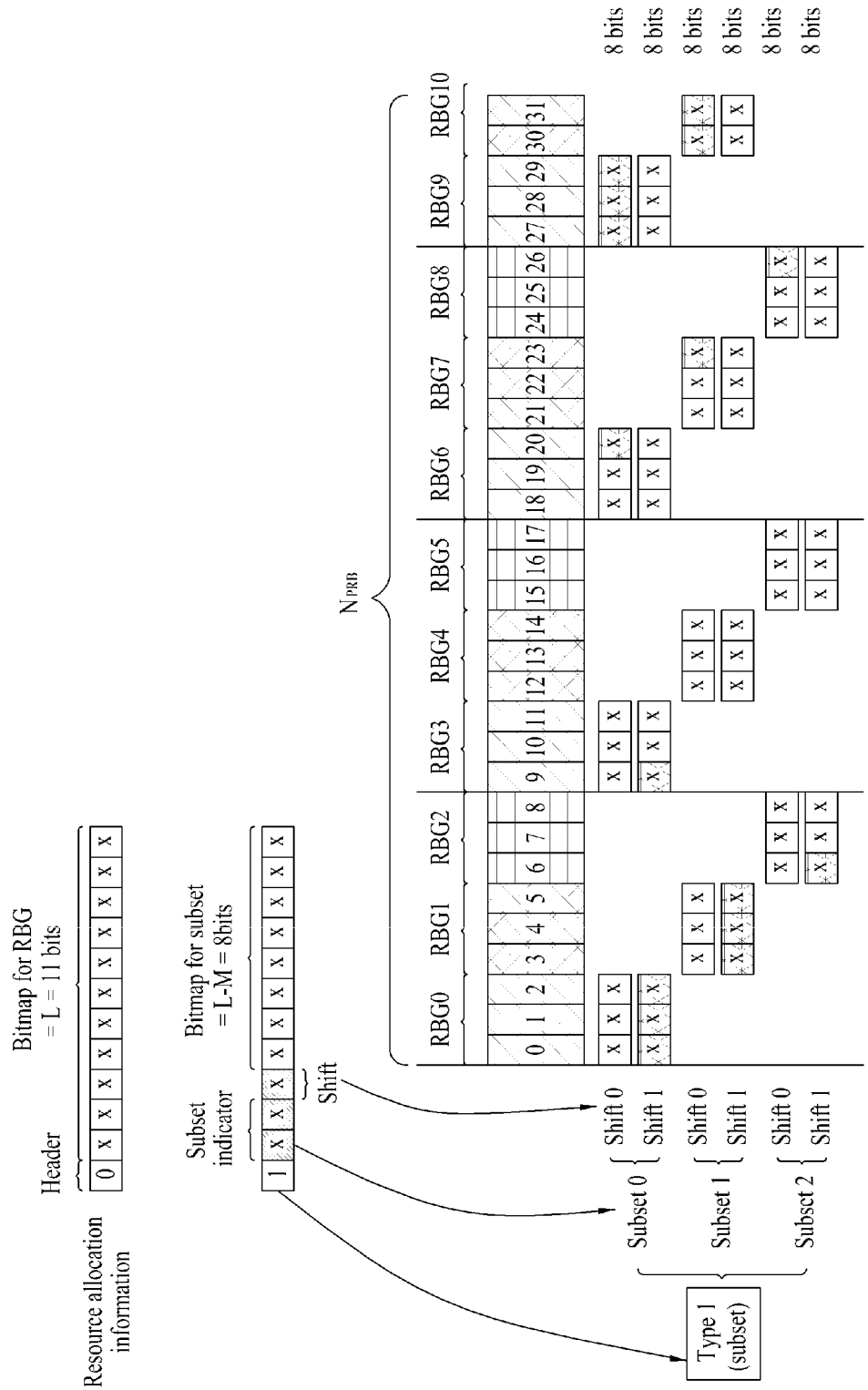
Figure 9:
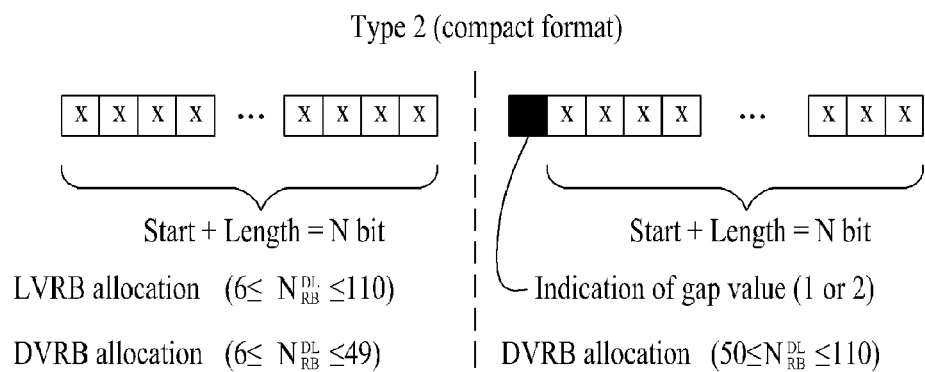

Hereinafter, a resource allocation scheme defined in the existing LTE will be described with reference to the drawings. FIG. 7, FIG. 8 and FIG. 9 are diagrams illustrating control information formats each for type 0 resource allocation, type 1 resource allocation and type 2 resource allocation, and resource allocation examples based on the control information formats.

The user equipment interprets a resource allocation field based on the detected PDCCH DCI formats. The resource allocation field within each PDCCH includes a resource allocation header field and two parts of actual resource block allocation information. The PDCCH DCI formats 1, 2 and 2A for resource allocation of the types 0 and 1 have the same format, and are divided from one another through a single bit resource allocation header field existing depending on a downlink system band. In more detail, the type 0 resource allocation is indicated by 0, and the type 1 resource allocation is indicated by 1. The PDCCH DCI formats 1, 2 and 2A are used for the type 1 resource allocation, whereas the PDCCH DCI formats 1A, 1B, 1C and 1D are used for the type 2 resource allocation. The PDCCH DCI format having the type 2 resource allocation does not have a resource allocation header field.

Referring to FIG. 7, in the type 0 resource allocation, resource block allocation information includes a bitmap indicating a resource block group (RBG) allocated to the user equipment. The RBG is a set of continuous PRBs. The RBG size (P) depends on the system band as illustrated in Table 3 below.

TABLE 3

| System band $N_{RB}^{DL}$ | RBG size (P) |
|---|---|
| ≤10 | 1 |
| 11-26 | 2 |
| 27-63 | 3 |
| 64-110 | 4 |

In a downlink system band having $N_{RB}^{DL}$ PRBs, a total number $N_{RBG}$ of RBGs is given by $N_{RBG}=\lceil N_{RB}^{DL}/P \rceil$, and $\lfloor N_{RB}^{DL}/P \rfloor$ RBGs have a size of P. In case of $N_{RB}^{DL}$ mod P>0, one of the RBGs is given by a size of $N_{RB}^{DL}-P \cdot \lfloor N_{RB}^{DL}/P \rfloor$. Also, mod represents modulo operation, $\lceil \ \rceil$ represents a ceiling function, and $\lfloor \ \rfloor$ represents a flooring function. The size of the bitmap is $N_{RBG}$, and each bit corresponds to one RBG. All the RBGs are indexed by $0 \sim N_{RBG}-1$ in a frequency direction, and RBG $0 \sim$ RBG $N_{RBG}-1$ are mapped from the most significant bit (MSB) of the bitmap into the least significant bit (LSB).

Referring to FIG. 8, in the type 1 resource allocation, $N_{RBG}$ sized resource block allocation information indicates resources within the RBG subset in a unit of PRB for the scheduled user equipment. The RBG subset p (0≤p<P starts from RBG p and is configured by the Pth RBG. The resource block allocation information includes three fields. The first field includes $\lceil \log_2(P) \rceil$ bits, and indicates RBG subset selected from P RBG subsets. The second field includes 1 bit, and indicates shift of resource allocation span within the subset. If a bit value is 1, shift is triggered. If the bit value is not 1, shift is not triggered. The third field includes a bitmap, and each bit indicates one PRB within the selected RBG set. A bitmap part used to indicate the PRB within the selected RBG subset has a size of $N_{RB}^{TYPE1}$, and is defined as expressed by the Equation 2 below.

$$N_{RB}^{TYPE1}=\lfloor N_{RB}^{DL}/P \rfloor-\lceil \log_2(P) \rceil-1 \quad \text{[Equation 2]}$$

An addressable PRB number in the selected RBG subset starts from offset ($\Delta_{shift}(p)$) for the smallest PRB number within the selected RBG subset, and may be mapped into the MSB of the bitmap. The offset is expressed by the number of PRBs, and is applied within the selected RBG subset. If the bit value within the second field for shift of the resource allocation span is set to 0, offset for the RBG subset p is given by $\Delta_{shift}(p)=0$. In other case, the offset for the RBG subset p is given by $\Delta_{shift}(p)=N_{RB}^{RBG\,subset}(p)-N_{RB}^{TYPE1} \cdot N_{RB}^{RBG\,subset}(p)$ represents the number of PRBs within the RBG subset p, and may be obtained by the Equation 3 below.

$$N_{RB}^{RBGsubset}(p) = \quad \text{[Equation 3]}$$

$$\begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1)\bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

Referring to FIG. 9, the resource block allocation information in the type 2 resource allocation represents a set of LVRBs or DVRBs continuously allocated to the scheduled user equipment. If resource allocation is signaled by the PDCCH DCI format 1A, 1B or 1D, a 1-bit flag indicates whether the LVRBs or DVRBs are allocated (for example, 0 represents LVRB allocation, and 1 represents DVRB allocation.). On the other hand, if resource allocation is signaled by the PDCCH DCI format 1C, only the DVRBs are always allocated. The type 2 resource allocation field includes a resource indication value (RIV), which corresponds to a start resource block $RB_{start}$ and length. The length represents the number of virtual resource blocks allocated continuously.

Figure 10:
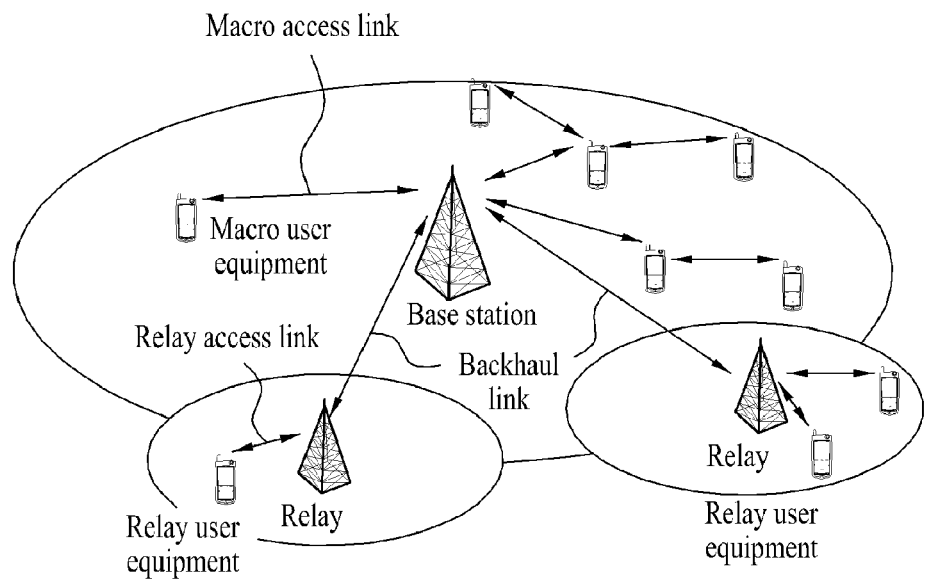
FIG. 10 is a diagram illustrating a wireless communication system that includes a relay.

FIG. 10 is a diagram illustrating a wireless communication system that includes a relay. The relay extends a service zone of the base station or provides a shaded zone to provide a seamless service. Referring to FIG. 10, the wireless communication system includes a base station, a relay and a user equipment. The user equipment performs communication with the base station or the relay. The user equipment that performs communication with the base station will be referred to as a macro user equipment (macro UE), and the user equipment that performs communication with the relay will be referred to as a relay user equipment (relay UE). A communication link between the relay and the relay user equipment will be referred to as an access link, and a communication link between the base station and the relay will be referred to as a backhaul link.

The relay may be classified into L1 (layer 1) relay, L2 (layer 2) relay, and L3 (layer 3) relay depending on how the relay performs a function in multi-hop transmission. Brief features of each of the relays will be described as follows. The L1 relay serves as a repeater, and transmits a signal from the base station/user equipment to the user equipment/base station by simply amplifying the signal. Since the relay does not perform decoding, it is advantageous in short transmission delay. However, since the relay does not identify noise from the signal, a problem occurs in that noise is unnecessarily amplified. In order to solve this problem, an advanced repeater or smart repeater having a function such as UL power control or self-interference cancellation may be used. The operation of the L2 relay may be represented by decoding-and-forwarding, wherein user plane traffic may be transmitted to the L2. In this case, although it is advantageous in that noise is not amplified, a problem occurs in that delay may be increased by decoding. The L3 relay may be referred to as self-backhauling, and IP packet may be transmitted to the L3. Since the L3 relay includes RRC function, it serves as a small scaled base station.

The L1 and L2 relays may be regarded as a part of a donor cell covered by the corresponding base station. When the relays are a part of the donor cell, they do not control their cell and user equipments of the corresponding cell, they may not have their cell ID. However, the relays may have their relay ID. In this case, a function of a radio resource management (RRM) may partially be controlled by the base station of the corresponding donor cell, and a part of the RRM may be located in the relay. The L3 relay may control its cell. In this case, the relay may control one or more cells, wherein each cell controlled by the relay may have unique physical-layer cell ID. The relay may have the same RRM mechanism as that of the base station. In view of the user equipment, there is no difference in whether the user equipment accesses a cell controlled by the relay or a cell controlled by the base station.

Also, the relay may be classified as follows depending on mobility.

Fixed relay node (RN): fixed permanently and used for enhancement of a shaded zone or cell coverage. It may function as a simple repeater.

Nomadic RN: installed temporarily when users increase, or movable randomly within buildings.

Mobile RN: built in public transportation means such as buses or subways, and should be supported with mobility.

Also, the relay node may be divided, as follows, depending on a link between the relay node and the network.

In-band connection: a network-to-relay link and a network-to-user equipment link share the same frequency band within a donor cell.

Out-band connection: a network-to-relay link and a network-to-user equipment link share their respective frequency band within a donor cell.

Also, the relay node may be classified, as follows, depending on whether the user equipment recognizes the relay node.

Transparent relay node: the user equipment cannot know whether communication with the network is performed through the relay node.

Non-transparent relay node: the user equipment knows that communication with the network is performed through the relay node.

Figure 11:
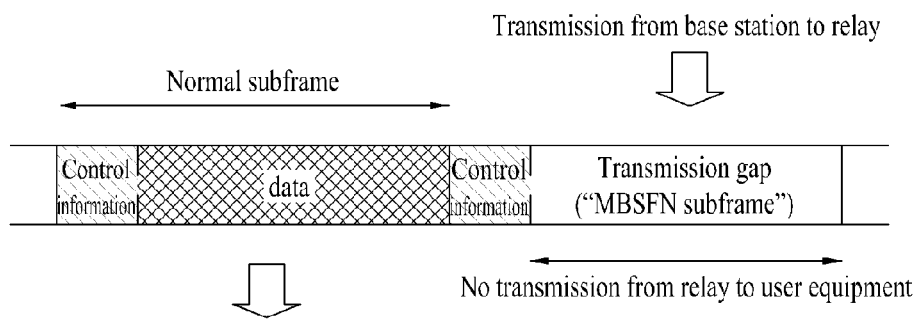
FIG. 11 is a diagram illustrating an example of backhaul transmission performed using a multicast broadcast single frequency network (MBSFN) subframe.

FIG. 11 is a diagram illustrating an example of backhaul transmission performed using a multicast broadcast single frequency network (MBSFN) subframe. In an in-band relay mode, a base station-relay link (that is, backhaul link) is operated at the same frequency band as that of a relay-user equipment link (that is, relay access link). If the relay transmits a signal to the user equipment while receives the signal from the base station, or vice versa, a transmitter and a receiver of the relay cause mutual interference, whereby simultaneous transmission and reception may be restricted. To this end, the backhaul link and the relay access link are partitioned by a TDM mode. In case of the LTE-A system, in order to support a measurement operation of legacy LTE user equipments existing in a relay zone, the backhaul link is set to a subframe signaled to MBSFN subframe (fake MBSFN method). If a random subframe is signaled to the MBSFN subframe, since the user equipment receives a control region only of the corresponding subframe, the relay may configure the backhaul link by using a data region of the corresponding subframe.

Figure 12:
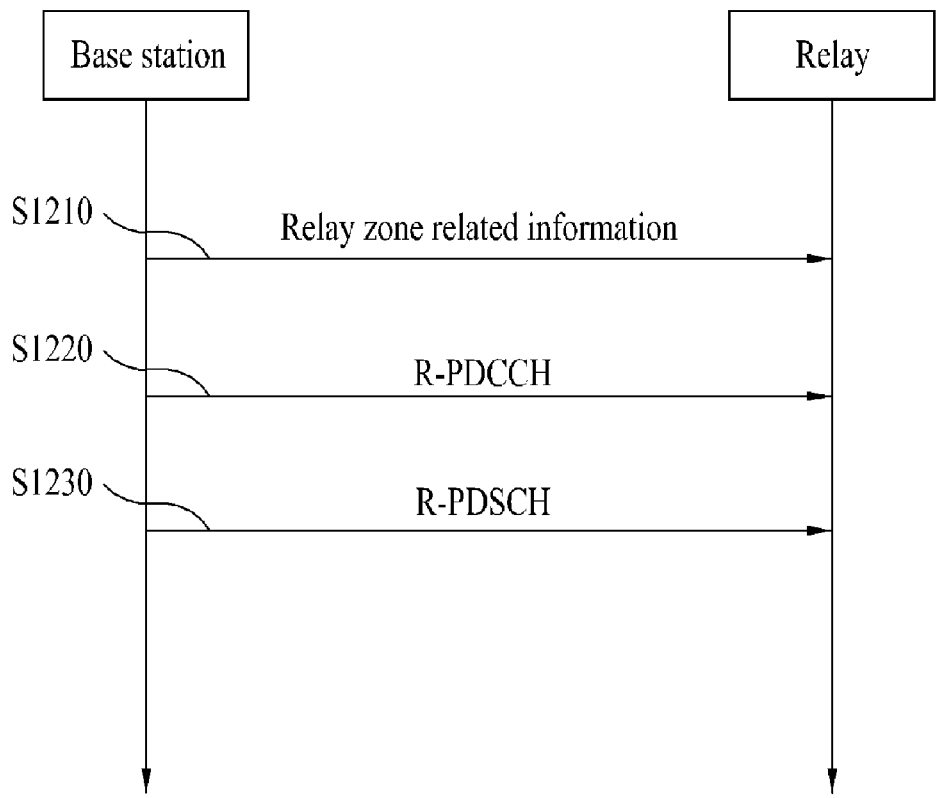
FIG. 12 is a diagram illustrating an example of signal reception of a relay from a base station.
Figure 13:
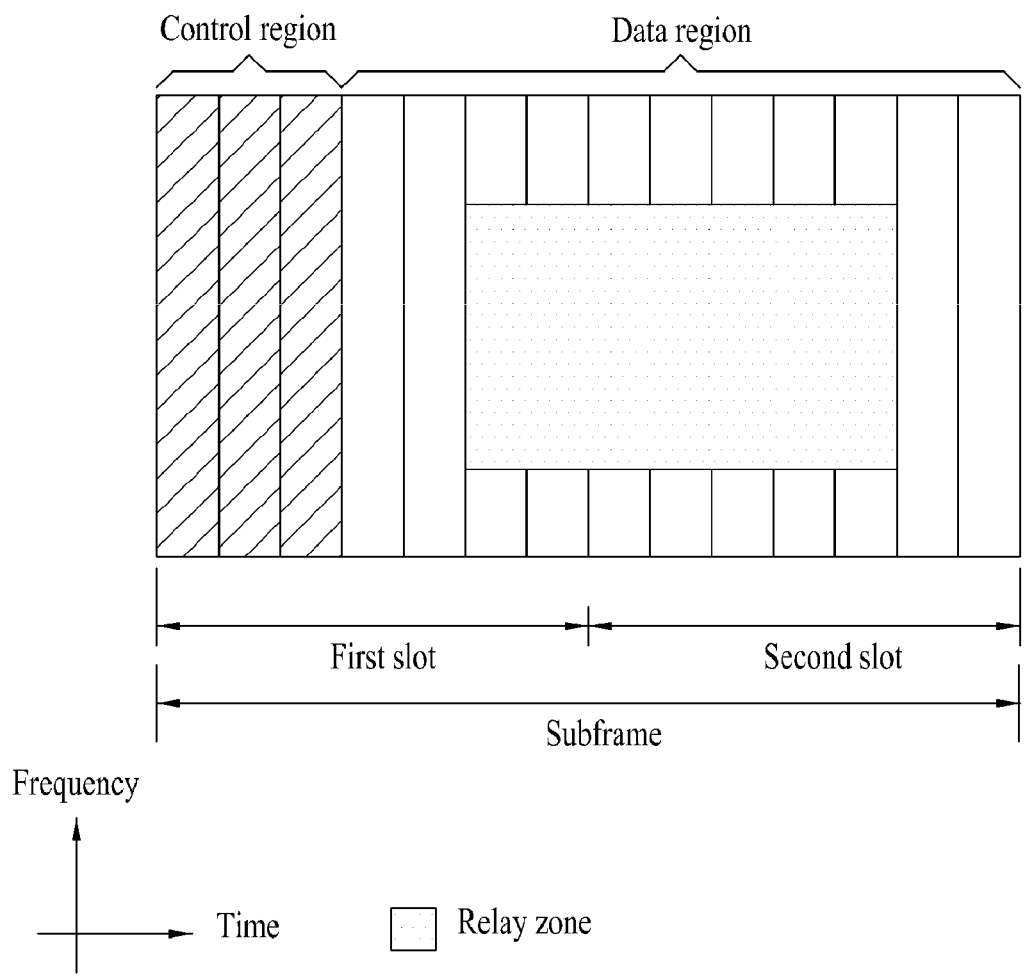
FIG. 13 is a diagram illustrating a relay zone set in a relay backhaul subframe.

FIG. 12 is a diagram illustrating an example of signal reception of a relay from a base station. FIG. 13 is a diagram illustrating a relay zone set in a relay backhaul subframe.

In order to allocate a resource dynamically or semi-statically, a physical control channel may be used in the backhaul subframe. The Physical control channel for allocating a relay backhaul resource will be referred to as R-PDCCH (Relay-PDCCH). The R-PDCCH may carry scheduling information on downlink backhaul data. The downlink backhaul data corresponds to R-PDSCH (Relay-PDSCH). The R-PDCCH may allocate a downlink resource at the same subframe or one or more subframes later.

Referring to FIG. 12 and FIG. 3, relay zone related information is transmitted from the base station to the relay (S1210). The relay zone related information includes resource information for setting up a relay zone at the backhaul subframe. The information for setting up a relay zone may be transferred from the base station to the relay before the base station and the relay performs a normal communication procedure through the R-PDCCH and the R-PDSCH, or may dynamically change a configuration of the relay zone even during the normal communication procedure. The relay zone mentioned in the present invention means a continuous or non-continuous region of a specific frequency resource for transmitting the R-PDCCH at a specific OFDM symbol interval. FIG. 13 illustrates that the relay zone is set to the sixth to twelfth OFDM symbol in the time domain and is continuously set to some band of the frequency domain. Resource allocation information for backhaul data is transmitted through the R-PDCCH, and the backhaul data are transmitted through the R-PDSCH. The R-PDSCH may be within or outside the relay zone. Afterwards, the relay receives the R-PDCCH (S1220), and receives data/control information through the R-PDSCH indicated by the R-PDCCH (S1230). The R-PDCCH may allocate an uplink resource from either an uplink subframe transmitted at the same time as the subframe of the same downlink or one or more subframes of the later uplink subframe.

Also, although not shown, the R-PDCCH may be used to allocate a resource for transmitting uplink backhaul data/control information dynamically or semi-statically. The uplink backhaul data/control information corresponds to R-PUSCH (Relay-PUSCH)/R-PUCCH (Relay-PUCCH). A subset of a resource may be use for each R-PDCCH within the PRBs allocated semi-statically for R-PDCCH transmission. A full set of resources actually used for R-PDCCH transmission within a relay zone (for example, PRB) allocated semi-statically may be varied dynamically by a rule previously defined for each subframe. These resources may correspond to all OFDM symbols that can be used for the backhaul link temporally, or may be limited to some of all the OFDM symbols. Also, the resources may correspond to all the RBs that can be used for the backhaul link on the frequency axis, or may be limited to some of all the RBs. The resources which are not used for the R-PDCCH within the relay zone allocated semi-statically may be used to carry the R-PDSCH or the PDSCH.

R-PDCCH transmission processing (for example, channel coding, interleaving, multiplexing, etc.) may be performed using processing defined in the existing LTE within a possible range, and may be simplified if necessary. For example, considering relay features, the R-PDCCH transmission processing may not be required for the processing defined in the existing LTE, or bandwidth-waste process may be omitted. If a concept of a search space defined in PDCCH detection in the existing LTE is also applied to the backhaul link, a common search space may be set semi-statically and may be used basically. Also, a relay node specific (RN-specific) search space is set, the relay may identify the relay node-specific search space directly or indirectly. If a cell specific reference signal (CRS) or cell common reference signal defined in the LTE during blind decoding of the R-PDCCH is used, a relay node-specific search space for each relay node may be subjected to interleaving. At this time, since actual interleaving may be varied depending on the number of relays for interleaving, the number of relays used for R-PDCCH decoding based on the CRS or the number of units for interleaving may previously be reported from the base station to the relay node relay node-specifically or cell-specifically. The R-PDCCH may be transmitted starting from the first OFDM symbol of the corresponding subframe depending on the subframe. Also, the R-PDCCH and the R-PDSCH may be transmitted through one PRB or different PRBs.

Hereinafter, the embodiment of the present invention will be described with reference to the drawings. A method for allocating a relay zone to a DL backhaul subframe to transmit the R-PDCCH and the R-PDSCH, a method for transmitting the R-PDCCH and the R-PDSCH within a relay zone, and a method for transmitting a PDSCH for a macro-user equipment within a relay zone will be described in more detail in accordance with the embodiments of the present invention. In the embodiments 1 to 3, it is assumed that R-PDSCH transmission is performed within a relay zone. Under the assumption that the relay zone is set for the R-PDCCH only and that the R-PDSCH is transmitted regardless of the relay zone, the embodiment 4 will be described based on modified portions of the embodiments 1 to 3.

Embodiment 1

Method for Allocating a Relay Zone for R-PDCCH/R-PDSCH

Embodiment 1-1

Allocation of Relay Zone Based on a Method for Resource Allocation According to Existing LTE The method for resource allocation according to the existing LTE includes three methods as described with reference to FIG. 7 to FIG. 8. In short, the type 0 resource allocation is to notify resource allocation information in a bitmap type, wherein PRBs that can be used in an available band are grouped in a unit of P to perform resource allocation in a unit of a resource block group (RBG). The number $N_{RBG}$ of RBGs (that is, the number of bits for resource allocation information) is determined as $N_{RGB}=\lceil N_{RB}^{DL}/P \rceil$.

The type 1 resource allocation is the same as the type 0 resource allocation in that resource allocation information is notified in a bitmap type. However, in the type 1 resource allocation, the resource allocation information is notified in a unit of resource block (RB) not resource block group (RBG). To this end, all the RBGs are divided into P sub groups, and resource allocation is performed in a unit of RB within the corresponding sub group. Also, shift of RBG unit is allowed within the sub group.

The type 2 resource allocation is to allocate virtually contiguous resources through a resource indication value called RIV within a given VRB. The type 2 resource allocation may reduce information for the resource allocation as compared with the bitmap mode of the type 0 resource allocation or the type 1 resource allocation. However, since the type 2 resource allocation can allocate contiguous resources only of VRB unit when multiplexing a plurality of PDSCH data, a problem occurs in that flexibility for multiplexing may be deteriorated. For application of the aforementioned resource allocation method, the base station may transmit signaling elements for the corresponding resource allocation method to each relay (RN-specific).

Detailed Example 1

In the same manner as the existing LTE, the base station may allocate the relay zone region on the frequency axis for backhaul data transmission by using the method for allocating a PDSCH resource through the PDCCH. For example, the base station may allocate the relay zone region on the frequency axis in a unit of RB, RBG, and VRB. To this end, a new PDCCH DCI format for allocation of the relay zone region may be defined. The new DCI format may include indication for a resource allocation method used for allocation of the relay zone region for R-PDCCH/R-PDSCH similarly to the resource allocation method defined in the existing LTE and resource allocation information based on the indication. CRC of the new DCI format may be transmitted by being scrambled with RNTI for relay(s).

Detailed Example 1-1

In addition to the resource allocation information on the frequency axis, start positions (for example, symbol position within a subframe) of relay transmission resources for the R-PDCCH and the R-PDSCH on the time axis may be reported from the base station to the relay. Meanwhile, if the position of the R-PDCCH is previously defined on the time axis, the base station may notify the relay of only the start position (for example, symbol position within a subframe) of the relay transmission resource for the R-PDSCH.

Detailed Example 1-2

In addition to the resource allocation information on the frequency axis, end positions (for example, symbol position within a subframe) of relay transmission resources for the R-PDCCH and the R-PDSCH on the time axis may be reported from the base station to the relay. Meanwhile, if the position of the R-PDCCH is previously defined on the time axis, the base station may notify the relay of only the end position (for example, symbol position within a subframe) of the relay transmission resource for the R-PDSCH.

Detailed Example 1-3

In addition to the resource allocation information on the frequency axis, lengths (for example, the number of symbols) of relay transmission resources for the R-PDCCH and the R-PDSCH on the time axis may be reported from the base station to the relay. Meanwhile, if the position of the R-PDCCH is previously defined on the time axis, the base station may notify the relay of only the length (for example, the number of symbols) of the relay transmission resource for the R-PDSCH.

Detailed Example 1-4

In addition to the resource allocation information on the frequency axis, a length of a guard time (GT) located at the start of relay transmission resources for the R-PDCCH and the R-PDSCH on the time axis may be reported from the base station to the relay. The guard time may be reported from the base station to the relay in a unit of slot, symbol, semi-symbol, 1/n symbol (n is an integer more than 2), or sampling time ($T_s$).

Detailed Example 1-5

In addition to the resource allocation information on the frequency axis, a length of a guard time (GT) located at the end of relay transmission resources for the R-PDCCH and the R-PDSCH on the time axis may be reported from the base station to the relay. The guard time may be reported from the base station to the relay in a unit of slot, symbol, semi-symbol, 1/n symbol (n is an integer more than 2), or sampling time ($T_s$).

Detailed Example 2

Allocation of the relay transmission resources for the R-PDCCH and the R-PDSCH based on the new DCI format for the relay are generally performed between the relays before the backhaul link between the base station and the relay is set. However, if change of the relay zone for the R-PDCCH/R-PDSCH is required even after the backhaul link is set, the base station may allow the relay(s) to receive information on a new relay zone after temporarily stopping access link transmission of the relay(s) to a random subframe (subframe set to backhaul or normal subframe). As another method, the relay may receive a PDCCH region only from the base station at a random subframe. In this case, the user equipment, which receives data through the relay access link, may not receive the PDCCH from the relay. Accordingly, the operation of the user equipment, which may transmit the PDSCH without receiving the PDCCH from the access link of the relay, should be defined. To this end, the operation of the user equipment, which receives multiple PDSCHs from one PDCCH, may be defined. For example, transmission information on a PDSCH of a current subframe may be transferred through the PDCCH transmitted from a previous subframe. In this case, since the relay should instantaneously receive a macro PDCCH while transmitting the PDCCH or the PDSCH to a relay user equipment, a transmission gap is required at a change interval of transmission and reception.

Detailed Example 3

Information related to allocation of the relay zone for R-PDCCH/R-PDSCH may be reported through higher-layer signaling (for example, MAC signaling and RRC signaling). The information related to allocation of the relay zone may include all kinds of information described in the detailed examples 1 and 2.

In the meantime, resource allocation of the relay zone may use RIV based type 2 resource allocation method preferably. This is because that the type 2 resource allocation method may easily be used for allocation and multiplexing of the bitmap type such as the type 0 resource allocation or the type 1 resource allocation. In a state that the relay zone is previously allocated using the type 0 resource allocation and the type 1 resource allocation, if the base station should perform the type 2 resource allocation of the LTE for the macro-user equipment, there may be restriction in resource allocation.

If the aforementioned method is used, since the allocation method is used while resource division used for the resource allocation method of the existing LTE is maintained, in a state that the relay zone and the PDSCH of the macro-user equipment coexist, the resources may be used efficiently without additional overhead to the macro-user equipment.

Embodiment 1-2

Pre-Allocation of Relay Zone as Resource Allocation of the LTE is Newly Defined In the aforementioned method, if the resource for the relay zone is allocated using the type 0 resource allocation or the type 1 resource allocation, there may be restriction in RIV that can be allocated to the type 2 resource allocation due to the relay zone allocated previously when the type 2 resource allocation such as PDCCH DCI formats 1A, 1B, 1C and 1D is performed. Also, even though the relay zone is allocated through the type 2 resource allocation, there may be restriction in scheduling even in the case that the DCI of the type 2 resource allocation for the macro-user equipment should use a distribution method and the relay zone is allocated by a localized method.

Accordingly, after a VRB is partially allocated to a resource region for the relay zone within the relay zone by a random method, the other frequency resource may be used for the macro-user equipment. To this end, for the other frequency resources, RBG and subset for bitmap allocation may be redefined in the type 0 resource allocation and the type 1 resource allocation, and VRB for distributed allocation and localized allocation may be redefined in the type 2 resource allocation. Indexing may newly be given to the redefined RBG, subset and VRB. The redefined indexing information should previously be transmitted to the macro-user equipment (for example, LTE-A user equipment), and resource allocation based on the redefined index is only useful for the subframe set to the backhaul. In a normal subframe where no relay zone exists, resource allocation based on the original index is performed. An index method for a resource region for macro user equipment except for the relay zone may be transferred to the LTE-A user equipment.

Detailed Example 4

At least one of the following information related to the relay zone may be transmitted to the relay and/or the user equipment to configure the redefined index information:

The number of RBs allocated to the relay zone; size of RBG used for the relay zone allocation (RB unit); the number of RBGs allocated to the relay zone; $N_{RBG}=\lceil N_{RB}^{DL}/P \rceil$ sized bitmap information representing RBG allocated to the relay zone; bitmap information of subset of RBG allocated to the relay zone (case where the relay zone is allocated by the type 1 RA); 1 bit information indicating shift of resource allocation within allocated subset (case where the relay zone is allocated by the type 1 RA); RIV allocated to the relay zone (RIV calculated based on subframe (that is, non-backhaul subframe); and random combination of the above information.

Figure 14:
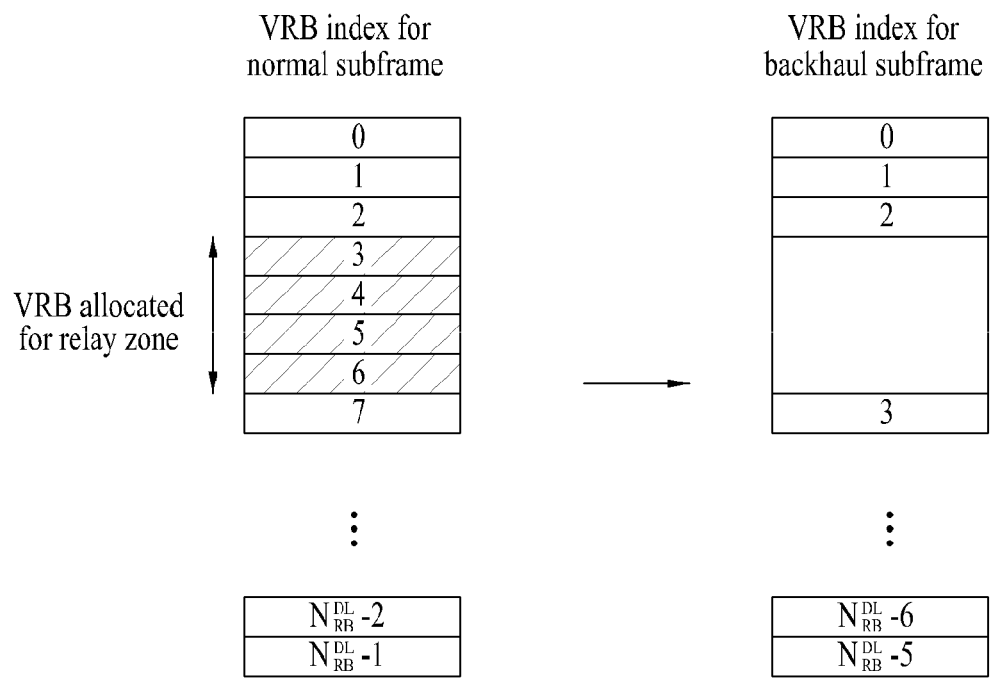
FIG. 14 is a diagram illustrating a method for allocating a relay zone in accordance with one embodiment of the present invention.

As illustrated in FIG. 14, the VRBs for VRB index applied for the macro-user equipment may be reconfigured based on the aforementioned information excluding frequency resource allocated for the relay zone from the backhaul subframe. Although VRB index has been described, PRB index may be used equally. Accordingly, the type 0 RA, the type 1 RA and the type 2 RA, which are defined in the existing LTE, may be configured equally for the other resources except for the VRB allocated to the relay zone. In this case, parameters for resource allocation are configured by values excluding the relay zone region. In the example of FIG. 14, the number of RBs that can be used for the full band may be calculated under remapped index, and the resource allocation method defined in the LTE may be used based on the calculated the number of RBs.

Embodiment 2

Method for Allocating R-PDSCH within a Relay Zone for R-PDCCH/R-PDSCH

Under the assumption that a random resource has been allocated to the relay zone for R-PDCCH and R-PDSCH, multiplexing of the R-PDSCH, which is a shared channel to which backhaul data/control information is transmitted within the relay zone, and the R-PDCCH determining allocation of the R-PDSCH will be described. In more detail, supposing that the R-PDCCH is obtained in a random time zone of the relay zone region by a random method, a resource allocation method for R-PDSCH on a frequency axis will be described.

Embodiment 2-1

Backhaul R-PDSCH Allocation Based on LTE RA Method

Three resource allocation RA methods defined in the LTE may be used equally. Supposing that the R-PDCCH and the R-PDSCH are completely divided from each other temporally, the R-PDSCH will be allocated to have the same time zone. For example, if first three symbols are defined and used as the R-PDCCH within the relay zone, the fourth symbol to the last symbol of the relay zone may be used as the R-PDSCH. However, since the R-PDCCH may use only a partial region of the frequency resource of the relay zone, if the R-PDCCH and the R-PDSCH are divided from each other temporally, waste may occur in the first three symbols for the R-PDCCH.

Detailed Example 5

Some or all of the OFDM symbols for the R-PDCCH may be allocated for the R-PDSCH in the relay zone. A plurality of R-PDSCHs may be allocated through the R-PDCCH. In this case, an index field for identifying RA fields for each R-PDSCH from the plurality of R-PDSCHs should be transmitted additionally. Also, in addition to the information defined in the LTE, at least one of the following RA related information may additionally be defined as the RA information for the R-PDSCH within the relay zone and may be transmitted from the base station to the relay(s):

Indication information (for example, 1-bit indicator) indicating whether the allocated R-PDSCH includes R-PDCCH region; index of OFDM symbol starting with the allocated R-PDSCH (index may be defined from either the start of the subframe or a start point of the relay zone); index of OFDM symbol ending with the allocated R-PDSCH (index may be defined from either the start of the subframe or a start point of the relay zone); a length of a guard time located at the end of the relay zone (slot unit, symbol unit, semi-symbol unit, 1/n symbol unit (n is an integer more than 2), or sampling time ($T_s$) unit); or random combination of the above information.

Embodiment 2-2

Backhaul R-PDSCH Allocation Based on R-PDCCH

Unlike the aforementioned method, resource allocation of the R-PDSCH may be bound with resource allocation of the R-PDCCH. In other words, the base station may selectively select resources on the frequency axis for R-PDCCH transmission of a specific relay in accordance with a channel status. Since it may be regarded that the channel status is maintained within the subframe, the R-PDSCH may be transmitted preferably through the same or similar frequency domain. In this case, load to transmit resource allocation information for the R-PDSCH may be reduced.

Detailed Example 6

Figure 15:
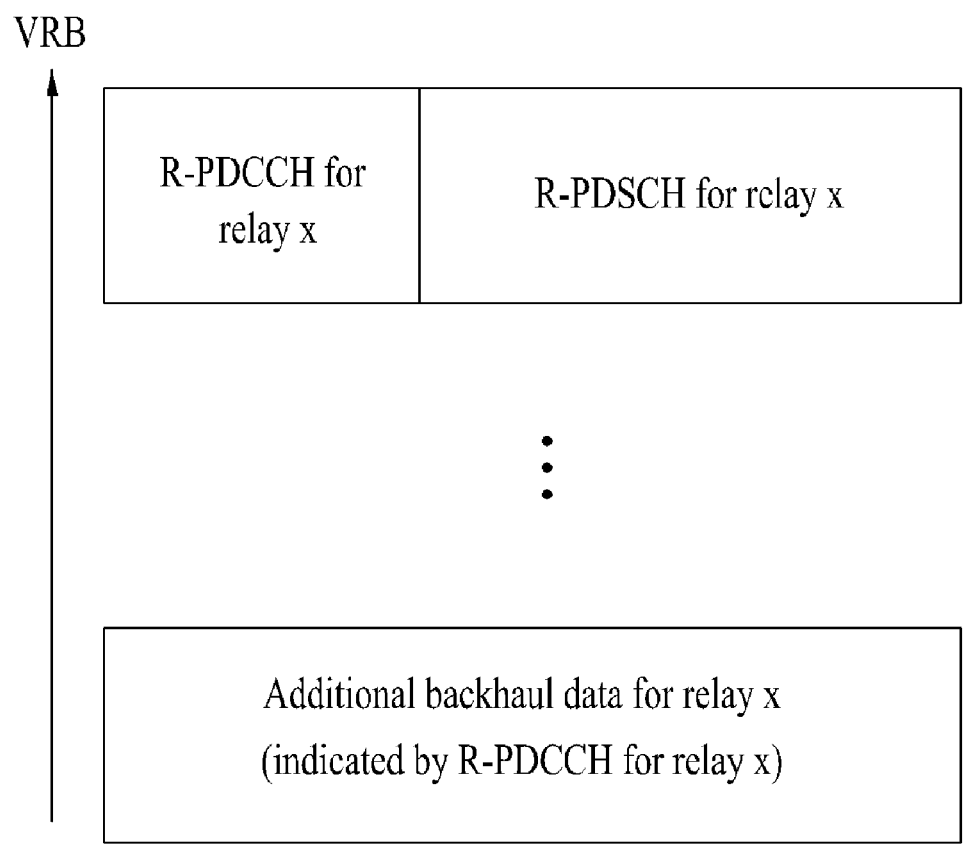
FIG. 15 to FIG. 18 are diagrams illustrating methods for allocating a relay-physical downlink control channel (R-PDCCH) and a relay-physical downlink shared channel (R-PDSCH) in accordance with one embodiment of the present invention.

As shown in FIG. 15, if the number of VRBs required for R-PDCCH transmission is the same as that required for R-PDSCH transmission, the R-PDSCH may be transmitted to the R-PDCCH without transmission of additional information for resource allocation RA of the R-PDSCH. Generally, the poorer the channel status is, the more the number of VRBs required for the R-PDCCH is. Since this is equally applied to the R-PDSCH, the number of VRBs required for each channel may be maintained equally by using a rate matching scheme. In other words, if resource allocation of the R-PDSCH is bound with that of the R-PDCCH, resource allocation RA for the R-PDSCH is performed by only transmission of RRC or relay-specific L1/L2 R-PDCCH. Meanwhile, in the same manner as mentioned above, additional R-PDSCH may be allocated through the R-PDCCH. In this case, since additional R-PDSCH includes a R-PDCCH region on the time axis, indication for the R-PDCCH region may be required. If a plurality of additional R-PDSCHs are required, information for indexing each R-PDSCH may be included in the R-PDCCH during configuration of transmission information.

Detailed Example 6-1

Supposing that the R-PDSCH having the same RA region as that of the R-PDCCH is referred to as a primary R-PDSCH and a plurality of additional R-PDSCHs are referred to as extended R-PDSCHs, the additional R-PDSCHs except for the primary R-PDSCH may be allocated using a bitmap method or RIV method. At this time, resource allocation RA for the extended R-PDSCHs may be performed through the methods described in the embodiment 2-1 and the detailed example 5. Also, the R-PDCCH may include an index field for indicating the plurality of extended R-PDSCHs.

However, the number of VRBs required for actual R-PDSCH transmission may not be the same as the number of VRBs required for R-PDCCH transmission. Accordingly, in a more normal status, R-PDSCH resource allocation method related to R-PDCCH may be considered.

Detailed Example 7

Figure 16:
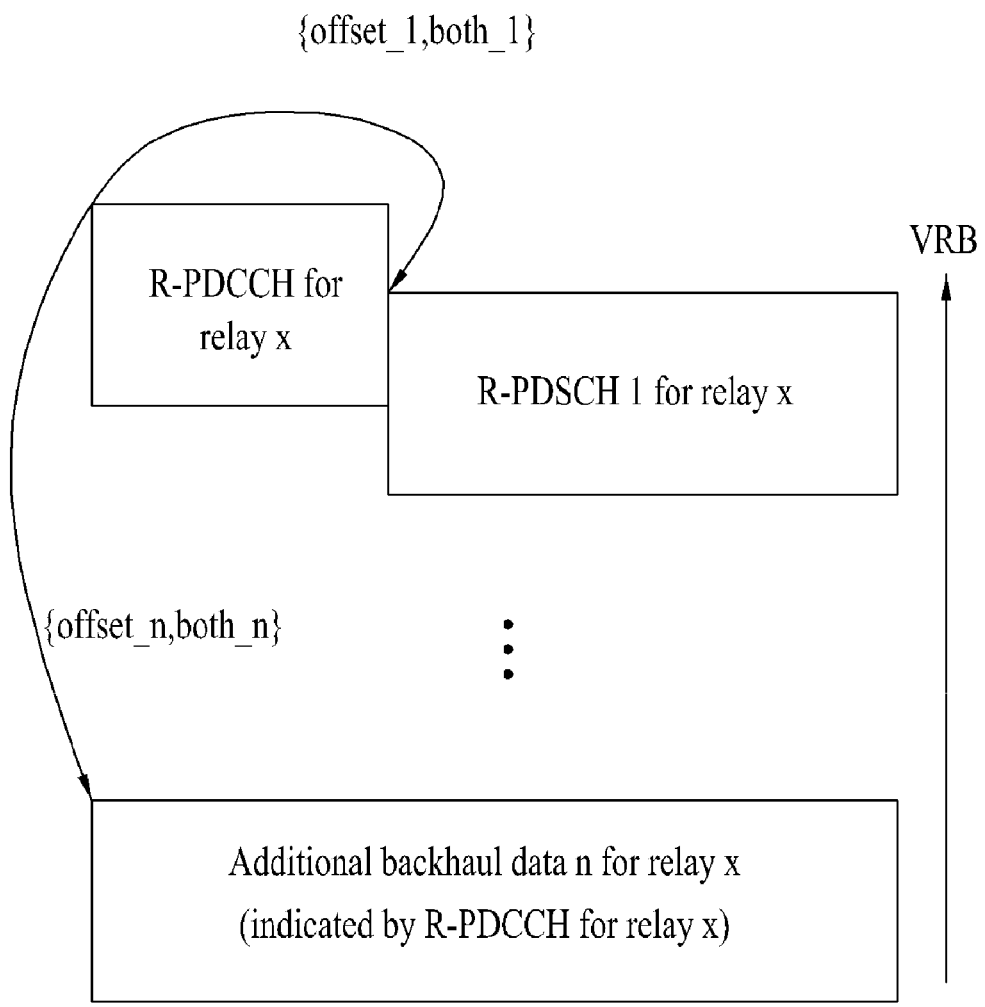
Figure 17:
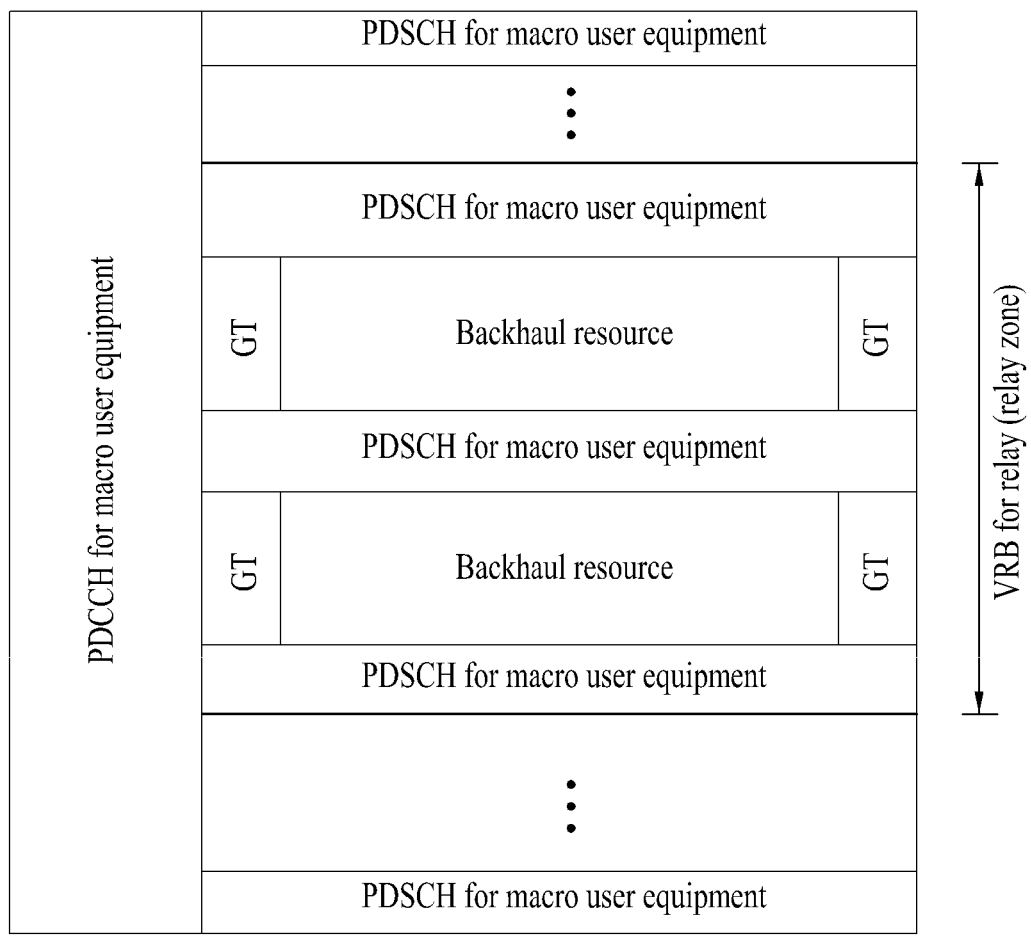

FIG. 16 is a diagram illustrating an example of normal R-PDCCH and R-PDSCH transmission. Referring to FIG. 16, the number of VRBs required for transmission of the R-PDSCH is different from the number of VRBs required for transmission of the R-PDCCH, and transmission positions of the R-PDSCHs may be defined as offset values from a random reference point of the R-PDCCH. In this case, offset may be defined as a slot, symbol or sampling time on the time axis, and may be defined as random group unit of VRB, VRB unit, or RB unit on the frequency axis. Values on the two axes may be defined or only a value on one axis may be defined. Also, since the size of resource allocation is different from that of the R-PDCCH, the size of resource allocation should be indicated, and its value may include information on the time axis/frequency axis and various units as described above in respect of the offset.

As another method, an offset based method may be used for the primary R-PDSCH (for example, R-PDSCH 1) and any one of the type 0 RA, the type 1 RA, and the type 2 RA, which are defined in the LTE, may be used for the extended R-PDSCHs (for example, R-PDSCHs 2~n). In this case, resource allocation RA for the extended R-PDSCHs may be performed through the methods described in the embodiment 2-1 and the detailed example 5. Also, the R-PDCCH may include an index field for indicating the plurality of extended R-PDSCHs.

Embodiment 3

Method for Allocating a PDSCH within a Relay Zone for R-PDCCH/R-PDSCH

If resources remain in the relay zone, the remaining region of the relay zone may be allocated to the PDSCH of the macro-user equipment to increase usage of the resources.

Embodiment 3-1

Allocation of Reserved Region of Relay Zone Using Type 0 Resource Allocation Method The type 0 resource allocation RA method is to group all the RBs into P number of groups and transfer allocation of each RB group in a bitmap type. Accordingly, if the remaining region within the relay zone may be allocated in a unit of P number of RBs in the same manner as that defined in a normal subframe, all or some of the remaining resources may be allocated to a specific user equipment and bitmap information may be reported to the specific user equipment in the same manner as the existing LTE. However, if a division size and a division region of the remaining resources are different from those of the normal subframe, a problem may occur.

Detailed Example 8

In order to solve the above problem, at least one of the following additional information may be transmitted to the macro-user equipment:

Indication information (for example, 1-bit indicator) indicating whether the allocated R-PDSCH resource exists in the relay zone; difference between grouping boundary in the normal subframe and grouping boundary in the relay zone; or random combination of the above information.

Embodiment 3-2

Allocation of Reserved Region of Relay Zone Using Type 1 Resource Allocation Method The type 1 resource allocation RA method is to divide all the RB groups into subsets and transfer RB unit allocation of each subset in a bitmap type. Accordingly, if the remaining region within the relay zone may be allocated in a unit of P number of RBs in the same manner as that defined in a normal subframe and size and configuration of the subsets are the same as those defined in the normal subframe, all or some of the remaining resources may be allocated to a specific user equipment and bitmap information of the subsets may be reported to the specific user equipment in the same manner as the existing LTE.

However, if the relay zone and relay backhaul resources in the relay zone are previously allocated, there is little chance that a resource size and a division region of the remaining region for the type 1 RA in the relay zone are the same as those of the normal subframe.

Detailed Example 9

In order to solve the above problem, at least one of the following additional information may be transmitted to the macro-user equipment:

Indication information (for example, 1-bit indicator) indicating whether the allocated R-PDSCH resource exists in the relay zone; difference between grouping boundary in the normal subframe and grouping boundary in the relay zone (for example, offset of RB or RBG unit); additional information (for example, bitmap) indicating RB that can be used in the allocated sub group; additional information (for example, bitmap) indicating RB (that is, RB already used in the relay zone) that cannot be used in the allocated sub group; or random combination of the above information.

Embodiment 3-3

Allocation of Empty Region of Relay Zone Using Type 2 Resource Allocation Method The type 2 resource allocation RA method is to configure VRB in a localized VRB (LVRB) or a distributed VRB (DVRB) and indicate information of virtually contiguous resources in RIV type. Accordingly, if the remaining region within the relay zone may be configured in the same manner as that defined in a normal subframe, all or some of the remaining resources may be allocated to a specific user equipment and bitmap information of the remaining resources may be reported to the specific user equipment in the same manner as the operation method of the LTE.

If the relay zone and relay backhaul resources in the relay zone are previously allocated, there is little chance that a resource size and a division region of the remaining region for the type 2 RA in the relay zone are the same as those of the normal subframe.

Detailed Example 10

In order to solve the above problem, at least one of the following additional information may be transmitted to the macro-user equipment:

Indication information (for example, 1-bit indicator) indicating whether the allocated R-PDSCH resource exists in the relay zone; difference between grouping boundary in the normal subframe and grouping boundary in the relay zone (for example, offset of RB or RBG unit); additional information (for example, bitmap) indicating RB, which can be used, among the RBs defined by the allocated RIV; additional information (for example, bitmap) indicating RB (that is, RB already used in the relay zone), which cannot be used, among the RBs defined by the allocated RIV; or random combination of the above information.

Embodiment 4

Definition of Relay Zone for R-PDCCH

In the embodiments 1 to 3, since it has been assumed that the relay zone is the resource region for the R-PDCCH and the R-PDSCH, allocation of the R-PDSCH has been performed in the relay zone. In the embodiment 4, supposing that the relay zone is the resource region for the R-PDCCH, a method for setting up a relay zone and a method for allocating a R-PDSCH and a PDSCH for a macro-user equipment will be described in detail.

Figure 18:
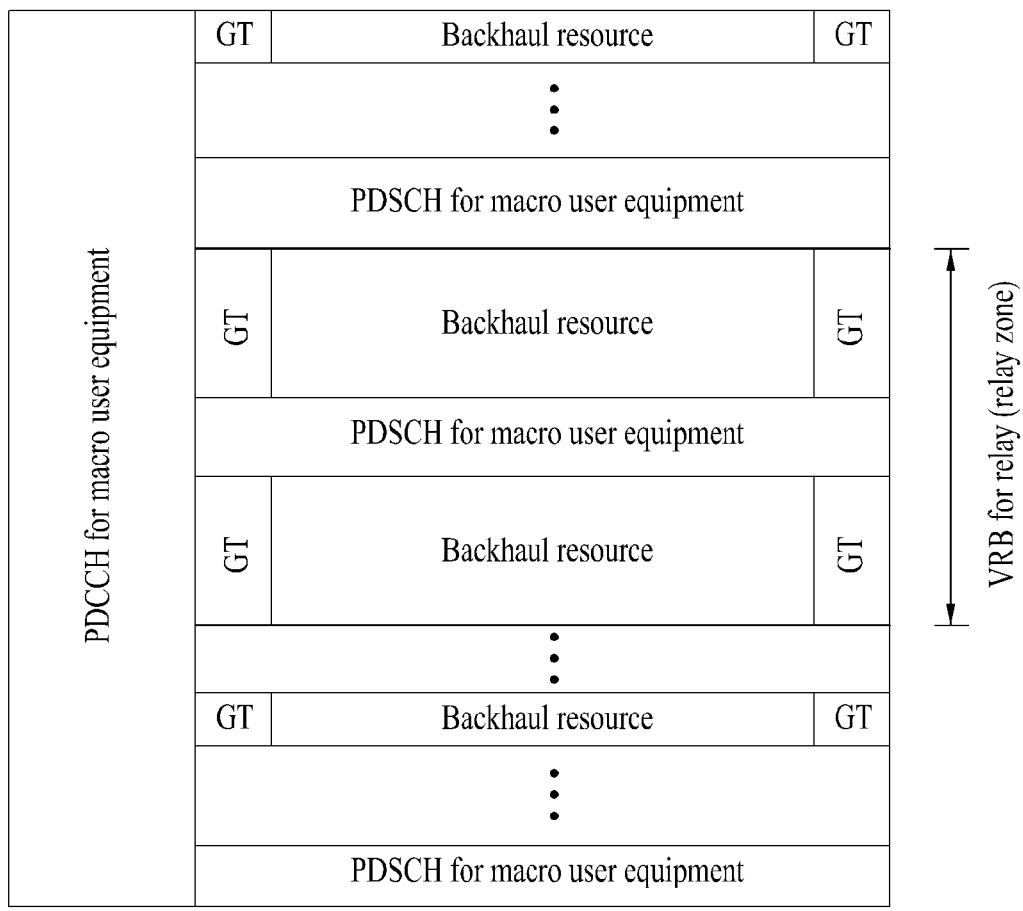

FIG. 18 is a diagram illustrating a configuration example of a backhaul subframe if a relay zone is limited to the R-PDCCH. As the relay zone is defined as above, the R-PDCCH is allocated within the relay zone, and a region which is not used as the R-PDCCH may be used as the R-PDSCH or the PDSCH for the macro-user equipment. Referring to FIG. 18, a backhaul resource (that is, R-PDSCH) for the relay may be allocated outside the relay zone.

Embodiment 4-1

Method for Setting up a Relay Zone for R-PDCCH

Regardless of definition of the relay zone, the methods for setting up the relay zone for the R-PDCCH/R-PDSCH, as described in the embodiments 1 to 3, may be used equally/similarly for allocation of the relay zone for the R-PDCCH only. Accordingly, the methods of the embodiments 1 to 3 are applied to the embodiment 4 equally.

Detailed Example 11

If an allocation region of the R-PDCCH is additionally limited to a specific region (for example, specific OFDM symbol) on the time axis, information on a time boundary point of the relay zone may be transferred from the base station to the relay through the PDCCH or higher layer signaling (for example, MAC signaling or RRC signaling) during allocation of the relay zone. The information on a time boundary point of the relay zone may be a slot unit, symbol unit, semi-symbol unit, 1/n symbol unit (n is an integer more than 2), or sampling time ($T_s$) unit. In more detail, the following time information may be transferred from the base station to the relay:

GT information for backhaul resource; bitmap index for a symbol where the R-PDCCH may exist; index for a start point of a symbol where the R-PDCCH may exist; index for an end point of a symbol where the R-PDCCH may exist; or the number of symbols where the R-PDCCH may exist.

Embodiment 4-2

Resource Allocation RA Method of R-PDSCH and PDSCH

In accordance with definition of the relay zone, the R-PDCCH may exist only in the relay zone. The type 0 RA, the type 1 RA, and the type 2 RA may be reused for a resource allocation method of the R-PDSCH based on the R-PDCCH. In this case, it is not required to define RA parameters for resource allocation of the R-PDSCH. In other words, R-PDSCH allocation from the relay backhaul subframe may be performed using RBG size used for the normal subframe, subset of RBG, and definition of VRB. Also, the aforementioned detailed examples 6, 6-1 and 7 may be used equally by the RA parameter of the normal subframe.

Embodiment 4-3

PDSCH Allocation in Relay Zone

If dimensioning of RB group for RA of the PDSCH for the macro-user equipment within the relay zone is configured differently from that of the normal subframe, the aforementioned detailed examples 8 to 10 may be used equally.

Figure 19:
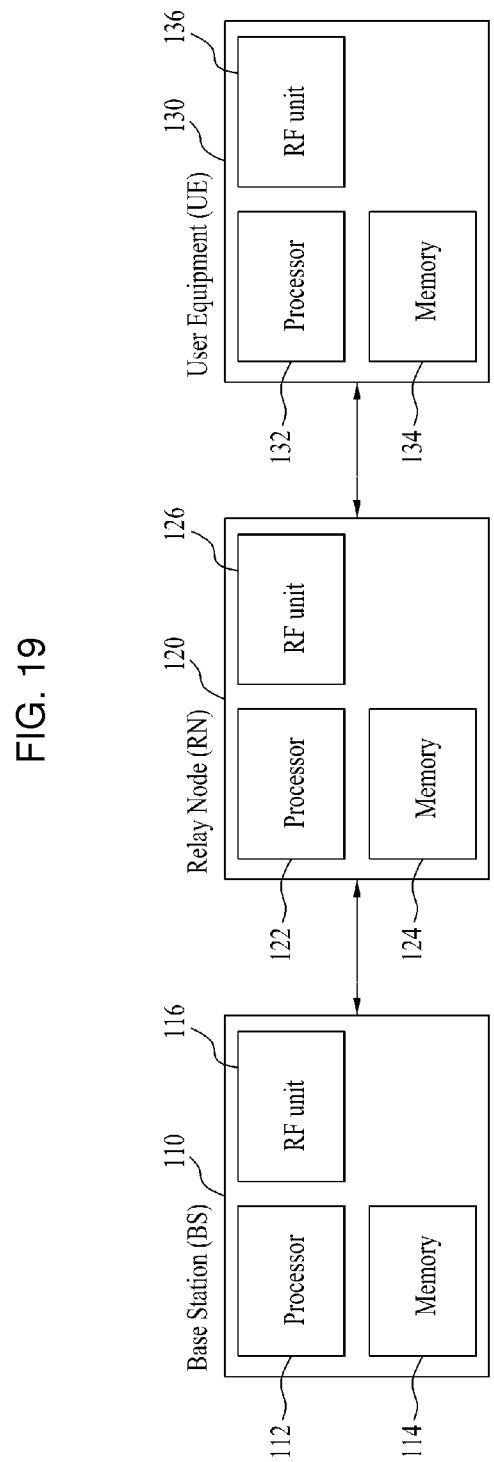
FIG. 19 is a diagram illustrating a base station, a relay and a user equipment, which can be applied to one embodiment of the present invention.

FIG. 19 is a diagram illustrating a base station, a relay and a user equipment, which can be applied to the present invention.

Referring to FIG. 19, a wireless communication system includes a base station (BS) 110, a relay node (RN) 120, and a user equipment (UE) 130. In the backhaul downlink, a transmitter is a part of the base station 110, and a receiver is a part of the relay node 120. In the backhaul uplink, the transmitter is a part of the relay node 120, and the receiver is a part of the base station 110. In the access downlink, the transmitter is a part of the base station 110 or the relay node 120. In the access uplink, the transmitter is a part of the user equipment 130, and the receiver is a part of the base station 110 or the relay node 120. In case of the macro-user equipment 130, a link is formed between the base station 110 and the user equipment 130. In case of the relay user equipment 130, a link is formed between the relay node 120 and the user equipment 130.

The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The relay node 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The user equipment 130 includes a processor 132, a memory 134, and a radio frequency (RF) unit 136. The processor 132 may be configured to implement procedures and/or methods suggested in the present invention. The memory 134 is connected with the processor 132 and stores various kinds of information related to the operation of the processor 132. The RF unit 136 is connected with the processor 132 and transmits and/or receives a radio signal. The base station 110, the relay node 120 and/or the user equipment 130 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method for allocating a relay backhaul resource and an apparatus for the same.

The invention claimed is:

1. A method for receiving a signal in a user equipment of a wireless communication system, the method comprising:
   receiving, from a base station, information on one or more first virtual resource blocks (VRBs) allocated for a relay;
   receiving resource allocation information from the base station through a physical downlink control channel (PDCCH); and
   receiving a predetermined resource block indicated by the resource allocation information among logically contiguous second VRBs in a backhaul subframe,
   wherein the logically contiguous second VRBs are re-indexed with valid index numbers in the backhaul subframe only when excluding the one or more first VRBs from an entirety of VRBs,
   wherein the logically contiguous second VRBs correspond to a physical downlink shared channel (PDSCH).

2. A user equipment comprising:
   a radio frequency (RF) unit configured to transmit and receive a radio signal to and from a base station; and
   a processor configured to receive, from the base station, information on one or more first virtual resource blocks (VRBs) allocated for a relay, to receive resource allocation information from the base station through a physical downlink control channel (PDCCH), and to receive a predetermined resource block indicated by the resource allocation information among logically contiguous second VRBs in a backhaul subframe,
   wherein the logically contiguous second VRBs are re-indexed with valid index numbers in the backhaul subframe only when excluding the one or more first VRBs from an entirety of VRBs,
   wherein the logically contiguous second VRBs correspond to a physical downlink shared channel (PDSCH).

* * * * *